(12) United States Patent
Mahadevan et al.

(10) Patent No.: US 9,147,177 B2
(45) Date of Patent: Sep. 29, 2015

(54) METHOD AND SYSTEM FOR IMPLEMENTING A SCORING MECHANISM

(75) Inventors: Krishnaraj Mahadevan, Hyderabad (IN); Anadi Upadhyaya, Hyderabad (IN); Ty Hayden, Grand Junction, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 613 days.

(21) Appl. No.: 12/267,174

(22) Filed: Nov. 7, 2008

(65) Prior Publication Data

US 2010/0121686 A1 May 13, 2010

(51) Int. Cl.
*G06Q 10/00* (2012.01)
*G06Q 10/10* (2012.01)
*G06Q 10/06* (2012.01)

(52) U.S. Cl.
CPC ............... *G06Q 10/10* (2013.01); *G06Q 10/06* (2013.01); *G06Q 10/06393* (2013.01)

(58) Field of Classification Search
USPC ............... 705/7.11–7.42; 707/608–610; 715/700–764
See application file for complete search history.

(56) References Cited

U.S. PATENT DOCUMENTS

| | | | |
|---|---|---|---|
| 5,619,688 A | 4/1997 | Bosworth et al. | |
| 5,666,526 A | 9/1997 | Reiter et al. | |
| 5,726,914 A | 3/1998 | Janovski et al. | |
| 5,924,073 A | 7/1999 | Tyuluman et al. | |
| 5,926,794 A * | 7/1999 | Fethe | 705/7.39 |
| 6,016,488 A | 1/2000 | Bosworth et al. | |
| 6,035,295 A * | 3/2000 | Klein | 1/1 |
| 6,049,779 A * | 4/2000 | Berkson | 705/14.39 |
| 6,338,042 B1 * | 1/2002 | Paizis | 705/7.37 |
| 6,754,874 B1 * | 6/2004 | Richman | 715/205 |
| 6,853,975 B1 * | 2/2005 | Dirksen et al. | 434/107 |
| 7,024,372 B2 * | 4/2006 | Kobayashi | 705/7.42 |
| 7,069,266 B2 * | 6/2006 | Calderaro et al. | 707/783 |
| 7,082,404 B2 * | 7/2006 | Calderaro et al. | 705/7.42 |
| 7,233,971 B1 | 6/2007 | Levy | |
| 7,376,569 B2 * | 5/2008 | Plunkett et al. | 705/320 |
| 7,610,288 B2 * | 10/2009 | Dickerson et al. | 705/1.1 |
| 7,647,322 B2 | 1/2010 | Thomsen | |
| 7,689,682 B1 * | 3/2010 | Eldering et al. | 709/223 |
| 7,693,808 B2 * | 4/2010 | Tingling | 706/45 |
| 7,707,052 B2 * | 4/2010 | Kuhn et al. | 705/7.38 |
| 7,801,755 B2 * | 9/2010 | Doherty et al. | 705/7.13 |
| 7,805,381 B2 * | 9/2010 | Habichler et al. | 705/320 |
| 2001/0032097 A1 * | 10/2001 | Levey | 705/1 |
| 2001/0032120 A1 * | 10/2001 | Stuart et al. | 705/11 |
| 2002/0019765 A1 * | 2/2002 | Mann et al. | 705/11 |
| 2003/0004736 A1 * | 1/2003 | Calderaro et al. | 705/1 |
| 2003/0004783 A1 * | 1/2003 | Calderaro et al. | 705/10 |
| 2003/0004789 A1 * | 1/2003 | Calderaro et al. | 705/11 |

(Continued)

OTHER PUBLICATIONS

Office Action dated Nov. 24, 2010 for U.S. Appl. No. 12/266,804.

(Continued)

*Primary Examiner* — Alan S Miller
(74) *Attorney, Agent, or Firm* — Vista IP Law Group, LLP

(57) ABSTRACT

Described is an improved method, system, and computer program product for implementing an improved method and system for generating performance scores for employees. Also disclosed is an approach for ranking employees which avoids the complexity and excessive resources often needed to implement employee rankings.

25 Claims, 13 Drawing Sheets

(56) References Cited

U.S. PATENT DOCUMENTS

| | | | | |
|---|---|---|---|---|
| 2003/0004790 | A1* | 1/2003 | Calderaro et al. | 705/11 |
| 2003/0149613 | A1* | 8/2003 | Cohen et al. | 705/11 |
| 2003/0200136 | A1* | 10/2003 | Dewar | 705/11 |
| 2003/0216957 | A1* | 11/2003 | Florence et al. | 705/11 |
| 2004/0012588 | A1* | 1/2004 | Lulis | 345/440 |
| 2004/0088177 | A1* | 5/2004 | Travis et al. | 705/1 |
| 2004/0128188 | A1* | 7/2004 | Leither et al. | 705/11 |
| 2004/0138944 | A1* | 7/2004 | Whitacre et al. | 705/11 |
| 2004/0210820 | A1 | 10/2004 | Tarr et al. | |
| 2004/0215503 | A1* | 10/2004 | Allpress et al. | 705/11 |
| 2005/0037326 | A1* | 2/2005 | Kuntz et al. | 434/353 |
| 2005/0154695 | A1* | 7/2005 | Gonzalez et al. | 707/1 |
| 2005/0192823 | A1* | 9/2005 | Kuhn et al. | 705/1 |
| 2005/0195747 | A1* | 9/2005 | Stamps et al. | 370/241 |
| 2005/0228762 | A1* | 10/2005 | D'Elena et al. | 706/1 |
| 2006/0010001 | A1* | 1/2006 | Hamelink | 705/1 |
| 2006/0015393 | A1 | 1/2006 | Eisma et al. | |
| 2006/0259340 | A1* | 11/2006 | Doherty et al. | 705/9 |
| 2007/0239468 | A1 | 10/2007 | O'Brien et al. | |
| 2007/0260513 | A1* | 11/2007 | Pavlov | 705/14 |
| 2007/0266054 | A1* | 11/2007 | Stephens et al. | 707/200 |
| 2007/0299709 | A1* | 12/2007 | Harrell et al. | 705/8 |
| 2008/0228549 | A1* | 9/2008 | Harrison | 705/9 |
| 2008/0235219 | A1 | 9/2008 | Dimitruk et al. | |
| 2009/0024647 | A1* | 1/2009 | Hein | 707/102 |
| 2009/0276297 | A1* | 11/2009 | Ehrler et al. | 705/11 |
| 2009/0307025 | A1* | 12/2009 | Menon | 705/7 |
| 2009/0319344 | A1* | 12/2009 | Tepper et al. | 705/11 |
| 2010/0064737 | A1 | 3/2010 | Upadhyaya et al. | |
| 2010/0100771 | A1 | 4/2010 | Upadhyaya et al. | |
| 2010/0106541 | A1 | 4/2010 | Upadhyaya et al. | |
| 2010/0114672 | A1* | 5/2010 | Klaus et al. | 705/11 |
| 2010/0121685 | A1 | 5/2010 | Mahadevan et al. | |
| 2010/0122218 | A1 | 5/2010 | Mahadevan et al. | |
| 2010/0125784 | A1 | 5/2010 | Hayden et al. | |
| 2010/0198634 | A1 | 8/2010 | Hayden et al. | |
| 2010/0223572 | A1 | 9/2010 | Upadhyaya et al. | |
| 2010/0274620 | A1 | 10/2010 | Upadhyaya et al. | |
| 2012/0047053 | A1* | 2/2012 | Favreau et al. | 705/35 |

OTHER PUBLICATIONS

Office Action dated Apr. 1, 2011 for U.S. Appl. No. 12/266,736.
Final Office Action dated May 9, 2011 for U.S. Appl. No. 12/266,804.
Non-final Office Action dated Nov. 20, 2013, for U.S. Appl. No. 12/266,736.
Non-final Office Action dated Mar. 12, 2013 for U.S. Appl. No. 12/266,736.
J. Simon, "Excel 2000 in a Nutshell", O'Reilly Media, Pub. Date Aug. 24, 2000, table of contents, pp. 1-4.
Final Office Action dated Jul. 29, 2013 for U.S. Appl. No. 12/266,736.
Non-final Office Action dated Oct. 4, 2013 for U.S. Appl. No. 12/266,804.
Advisory Action dated Oct. 10, 2013 for U.S. Appl. No. 12/266,736.
Final Office Action dated Sep. 29, 2011 for U.S. Appl. No. 12/266,736.
Advisory Action dated Jan. 17, 2012 for U.S. Appl. No. 12/266,736.
Non-final Office Action dated Aug. 6, 2014 for U.S. Appl. No. 12/266,804.
Notice of Allowance dated Aug. 15, 2014 for U.S. Appl. No. 12/266,736.
Final Office Action dated Mar. 21, 2014 for U.S. Appl. No. 12/266,736.
Final Office Action dated Mar. 28, 2014 for U.S. Appl. No. 12/266,804.
Advisory Action dated May 30, 2014 for U.S. Appl. No. 12/266,736.
Notice of Allowance dated Jun. 6, 2014 for U.S. Appl. No. 12/266,804.
Final Office Action dated Dec. 12, 2014 for U.S. Appl. No. 12/266,804.
Notice of Allowance dated Jan. 7, 2015 for U.S. Appl. No. 12/266,736.
Non-final Office Action dated May 14, 2015 for U.S. Appl. No. 12/266,804.

* cited by examiner

METHOD AND SYSTEM FOR IMPLEMENTING A SCORING MECHANISM

CROSS REFERENCE TO RELATED APPLICATIONS

The present application is related to co-pending U.S. patent application Ser. No. 12/266,804, entitled "METHOD AND SYSTEM FOR IMPLEMENTING A RANKING MECHANISM", filed on even date herewith, which is hereby incorporated by reference in its entirety.

BACKGROUND AND SUMMARY

The invention is directed to an approach for implementing scoring and performance ranking systems/methods.

Performance appraisals are generally used to measure and quantify the job performance of employees within an organization. There are many reasons for performing such appraisals of employees. For example, such appraisals are often used to document criteria for allocating organizational rewards, to form the basis for salary, bonus, stock grants and any other type of compensation allocation decisions, and to provide reasons for promotions or disciplinary actions.

There are many approaches that can be taken to undertake performance appraisals. A common approach to assessing employee performance is to use rating system whereby managers are asked to score an individual against a number of objectives and attributes. In some companies, employees receive only receive these rating assessments from their managers. In other organizations, such assessments may also be received from other individuals and entities, such as ratings from peers, subordinates, and customers.

One problem with conventional rating systems is that they are often at a very high level of granularity. For example, many organizations provide nothing more than a set of generic ratings for employees for individual categories encapsulated by terms such as "meets expectations," "exceeds expectations," or "needs improvements." While these are generic categories that are easy to understand and apply to employee ratings, they are at too high of levels to adequately provide specific ratings to employees. Organizations often want a more granular rating/ranking system than are provided by conventional approaches. For example, an organization might have 60% of the employee ratings in the middle positions, but still need to understand how people are ranked within that group. Even if these categories are converted into numerical ratings, there are difficulties in applying these ratings to compare different employees.

Therefore, an organization may wish to use a system of employee rankings to supplement its performance rating systems. Unlike a pure numerical rating, a ranking system will attempt to generate an ordered list of the employees based upon the one or more measures of the employees' performance or ratings. Ranking allows managers in an organization to rank their workforce from 1 to N, where 1 is the highest ranking employee and N is the lowest ranking employee. With ranking, it is easy to identify for example, the top 15% of an Enterprise or the lowest 5%. This then can assist in the compensation or promotion processes. Employees are usually ranked at all levels in the organization hierarchy with each manager ranking employees under them out of their total population. In such a ranking system, it is difficult to compare employee ranks obtained at various levels.

One way to implement a ranking system is where every manager provides a rank recommendation for employees that report to that manager. This recommendation is then submitted to his supervisor who repeats the step for his larger population. This process rolls up through the multiple hierarchical levels of the organization. At the end of this process, there will be a final ordering of the 1 to N ranks for the total workforce.

The problem is that typically, ranking is a very manual and time-consuming process. Within a ranking system, it may be very difficult to determine rankings for individual employees. One reason for this is because with organizations having high employee population levels, it becomes very difficult for managers to assign individual ranks to their employees. For example, a typical high-level manager may have many hundreds or thousands of employees within his/her hierarchical chain. Manually assigning ranks to hundreds or thousands of employees is a virtually impossible task for the manager, especially given that there are exponential complexities that must be considered for organizations that have many employees at many different hierarchical levels.

Moreover, the high level managers may not even have the time, knowledge, or correct level of perspective to be able to adequately rank individual employees—the high level manager may have personal knowledge of his direct reports, and perhaps even to a few more levels of reporting beneath his direct reports. However, at some point, the chain of reporting extends far enough away from the manager such that he will not have the proper level of interaction or focus to be able to individually know and compare the employees. Therefore, these managers almost entirely have to rely on the ranking by lower managers.

To address these and other problems, some embodiments of the present invention provide an improved approach for implementing employee scorings. Also described in some embodiments is an improved approach for implementing employee ratings and rankings. Other and additional objects, features, and advantages of the invention are described in the detailed description, figures, and claims.

BRIEF DESCRIPTION OF FIGURES

FIGS. 5A-C illustrate example user interfaces that can be used to generate a performance score according to some embodiments of the invention.

FIGS. 8A-C illustrate example user interfaces that can be used to perform auto-ranking according to some embodiments of the invention.

DETAILED DESCRIPTION

Embodiments of the present invention provide an automated approach for ranking employees which avoids the complexity and excessive resources often needed to implement employee rankings. This provides numerous advantages over conventional ranking systems which are performed in a completely manual way, which requires valuable time and effort from the individuals responsible for generating the rankings. Moreover, the present approach is much more efficient since it avoids problems with the prior approaches caused by requiring individuals (e.g., managers) to manually rank, where those individuals (managers) do not have the requisite knowledge to accurately provide such rankings across the range of employees being ranked.

Illustrative examples of embodiments of the invention are provided below that describe the invention in the context of hierarchical employee rankings for organizations based upon scoring data from managers. It is noted, however, that the present invention can be employed to provide an improved scoring approach and auto-ranking for any subject matter or organizational structure that may need to be scored and/or ranked. As a result, the invention is not to be limited in the employment context for hierarchical rankings unless explicitly claimed as such.

Figure 1:
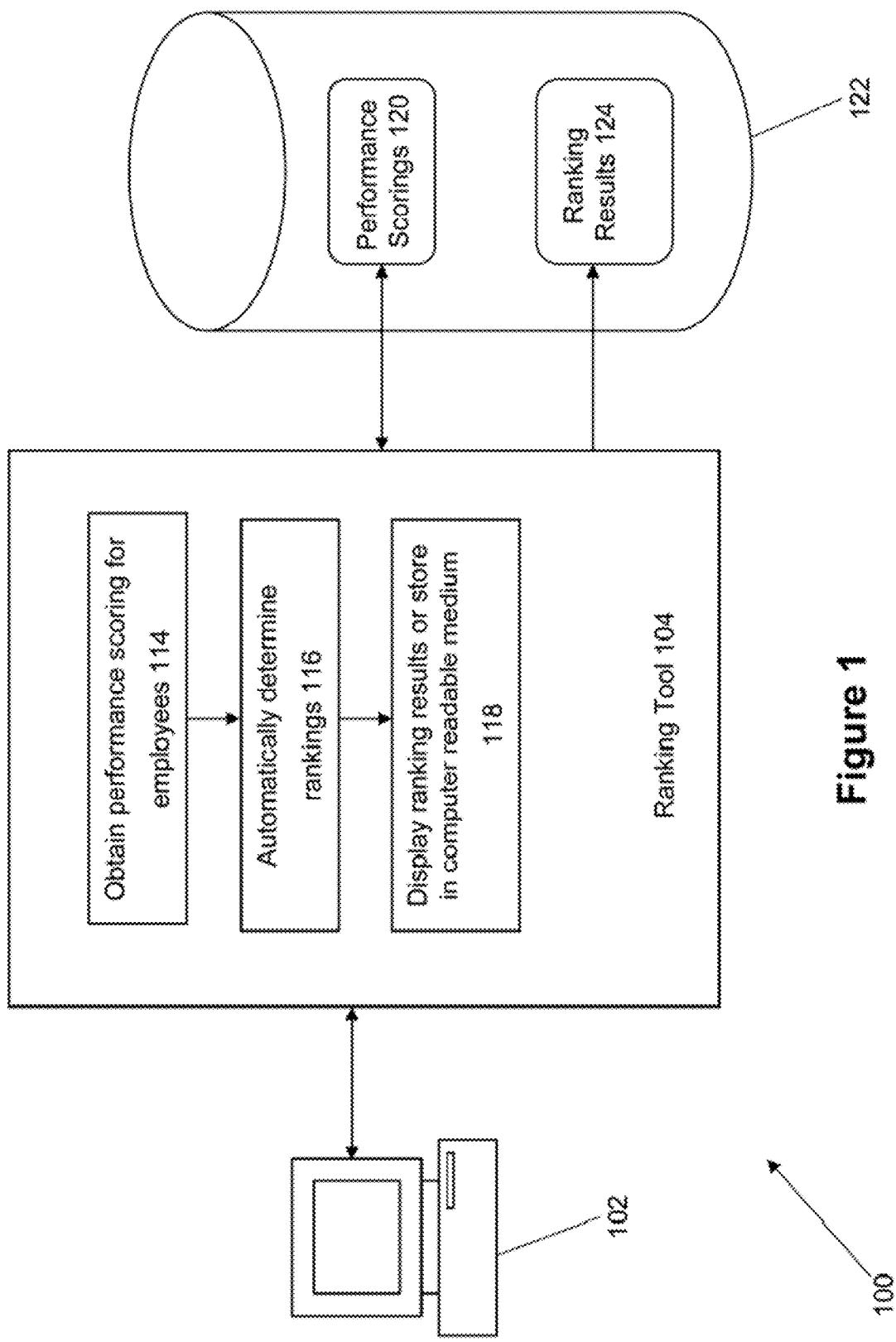
FIG. 1 shows an architecture of a system for performing ranking according to some embodiments of the invention.

FIG. 1 shows an architecture of a system 100 for performing auto-ranking according to some embodiments of the invention. System 100 comprises one or more users at one or more user stations 102 that access a ranking tool 104. Ranking tool 104 can be implemented as software, hardware, or a combination of both software and hardware. Ranking tool 104 may be implemented as a stand-alone tool, or as an application that accesses other tools and programs. According to one embodiment, ranking tool 104 comprises a software-based database application that is used in conjunction with data controlled by a database management system (DBMS) product.

FIG. 1 shows a database 122 that is communicatively coupled to the ranking tool 104. Database 122 includes data that is operated upon, or stored by, the ranking tool 104. The example database 122 of FIG. 1 includes a set of scoring data 120 containing employee scores for employees that are to be ranked by ranking tool 104. For each employee, the scoring data 120 for that employee relates to a score value related to a performance assessment of that employee. Any suitable scoring or ranking approach may be used to provide data 120 for the auto-ranking approach of the present invention.

Ranking tool 104 implements the functionality of performing auto-ranking for employees in an organization. Ranking tool 104 obtains performance scoring data 120 from the database 122 to perform the auto-ranking functionality (114). Based upon the performance scoring data 120, the ranking tool 104 automatically determines rankings for the employees (116). According to some embodiments, the ranking results 124 provides a numeric rank for an employee, where a manager cannot give an employee a ranking of 0 or a negative value. The manager gives a whole number for ranking without any decimals, and there is no maximum to the ranking value. A manager can give same ranking to multiple people, which could result in a ranking tie for employees. In addition, a manager can leave gaps in the ranking. The ranking results 124 can be displayed to the users at user station 102 (118). In addition to or instead of displaying the ranking results at station 102, the ranking results 124 can be stored in a computer readable medium. For example, the ranking results 124 can be stored in memory or on persistent storage used by database 122.

Scoring Mechanism

Any suitable scoring approach can be employed within the scope of embodiments of the invention to generate the scoring data 120. According to one embodiment, the scoring data comprises 1 to N rankings of employees that were generated by a lower level manager. For example, if a local manager M has three direct reports E1, E2, and E3, then each of the direct reports (E1, E2, E3) would be given a ranking of 1, 2, or 3 depending upon how they are ranked relative to each other.

Another scoring approach that can be used in some embodiments of the invention is a percentage-based score for employees. In this approach, rather than providing a direct numerical rank for each employee that reflects the relative rank of that employee as a whole number from 1 to N, the employee is instead given a ranking percentile relative to his/her peers. For example, if an employee E1 is ranked by manager M as number 20 of 100 employees, then that employee E1 has a ranking percentile of 0.20. This percentile value would be arrived at for every employee under manager M for the ranks given by his direct reports. Assuming that 50 employees have a better (lower) percentile than employee E1 after such calculation, then E1 then gets a rank of 51.

This document will now describe an inventive approach for employee scoring that can be used for auto-ranking, and which provides numerous advantages over alternative approaches. This new scoring approach provides more granular scoring data.

Figure 2:
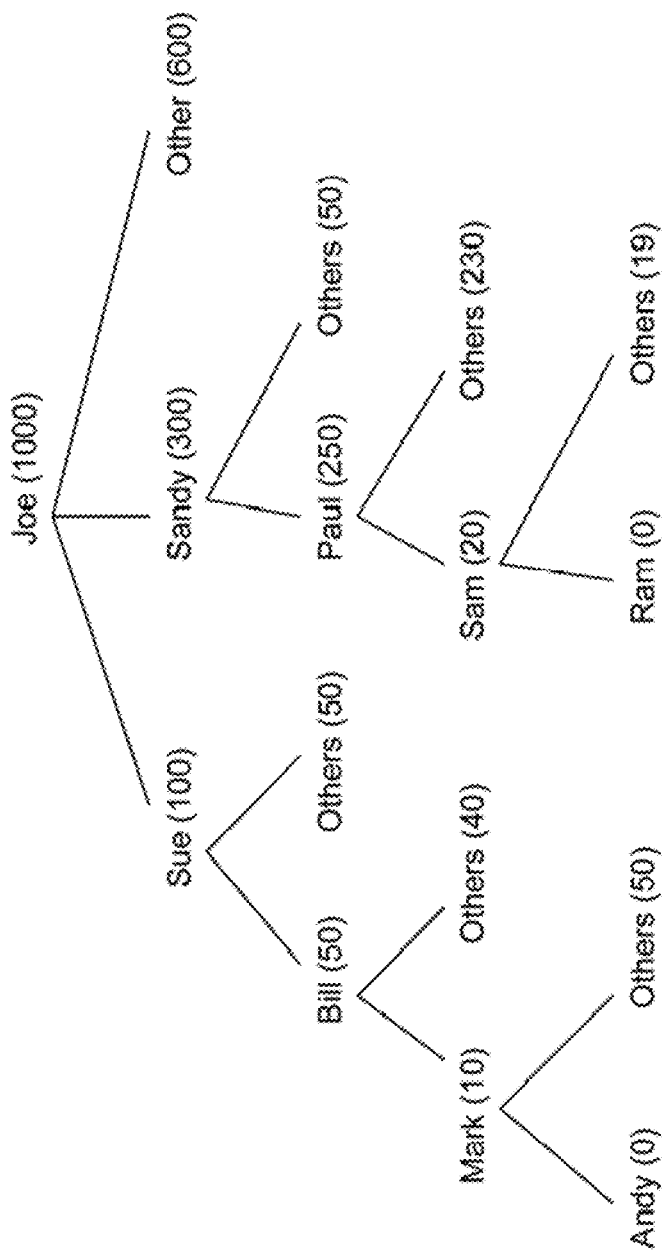
FIG. 2 illustrates an example hierarchy of employees and managers.

Employees are usually ranked at all levels in the organization hierarchy with each manager ranking employees under them out of their total population. In such a ranking system, it is difficult to compare employee ranks obtained at various levels. For example, consider the following hierarchies:

Joe(1000)→Sue(100)→Bill(50)→Mark(10)→Andy
Joe(1000)→Sandy(300)→Paul(250)→Sam(20)→Ram These hierarchies can be represented by the tree structures shown in FIG. 2. In particular, the hierarchical tree shows that Joe is the highest level manager having 1000 employees beneath him in the hierarchy. Along one branch of the hierarchical tree, Sue is a manager reporting to Joe with 100 employees beneath her in the hierarchy. Beneath Sue, Bill is a manager reporting to Sue having 50 employees in under him. Mark is a manager beneath Bill, with 10 employees under him. Andy is an employee who reports to Mark, and does not have any employees who report to him.

Along a second branch of the hierarchy beneath Joe, Sandy is a manager having 300 employees under her. Paul is a manager reporting to Sandy with 250 employees under him in the hierarchy. Sam is a manager beneath Paul with 20 employees beneath him in the hierarchy. Ram is an employee that directly reports to Sam and who has no employees reporting to him.

There are several interesting details that should be noted about this employment hierarchy. For example, it can be seen that Andy and Ram are both employees and are not managers. Both Mark and Sam are level 1 managers at the same level of the hierarchy. In addition, Bill and Paul are both managers at the same level of the hierarchy. Sue and Sandy are both managers at the same level of the hierarchy that directly report to highest level manager Joe.

Now, assume that it is desired for high level manager Joe to generate a score for each of the employees Andy and Ram. Further assume that each manager beneath Joe for these employees has provided a ranking of how these employees rank relative to other employees within their respective portions of the hierarchical tree. An example of such rankings for Andy could be the following:

| For employee Andy: | |
|---|---|
| By Mark | 1 of 10 |
| By Bill | 15 of 50 |
| By Sue | 30 of 100 |

These rankings for Andy indicate that manager Mark has ranked Andy as the top employee of the 10 employees beneath Mark in his portion of the employment hierarchy.

Manager Bill has ranked Andy 15 out of the 50 employees beneath Bill. Manager Sue has ranked Andy 30 out of the 100 employees beneath Sue in the hierarchy.

The following are example rankings that could be provided for employee Ram:

| For employee Ram: | |
|---|---|
| By Sam | 2 of 20 |
| By Paul | 50 of 250 |
| By Sandy | 60 of 300 |

These rankings indicate that manager Sam has ranked Ram as the second best employee of the 20 employees beneath Sam in his portion of the employment hierarchy. Manager Paul has ranked Ram 50 out of the 250 employees beneath Paul. Manager Sandy has ranked Ram 60 out of the 300 employees beneath Sandy in the hierarchy.

At this point, Joe is left with the task of ranking Andy and Ram out of 1000 employees. However, even with the ranking data provided above, this is a difficult task since these two employees have been ranked at each level out of different population sizes, and therefore it is difficult for the high/middle level manager (Joe in this case), to determine which employee is to be ranked above the other. He may not have enough information to take a fair or informed decision.

Even though absolute ranks from 1 to N are often what organizations desire for their workforce, arriving at those ranks by just looking at ranks assigned at lower levels is a difficult, and time consuming process for higher level managers. Managers often take an arbitrary decision and ranks assigned by them may not reflect the actual performance of employees. Assume a scenario wherein the organization is retrenching the bottom 5% of their workforce based on ranking. Incorrect ranking may lead to retention of the worst performers and retrenchment of the good ones.

Figure 3:
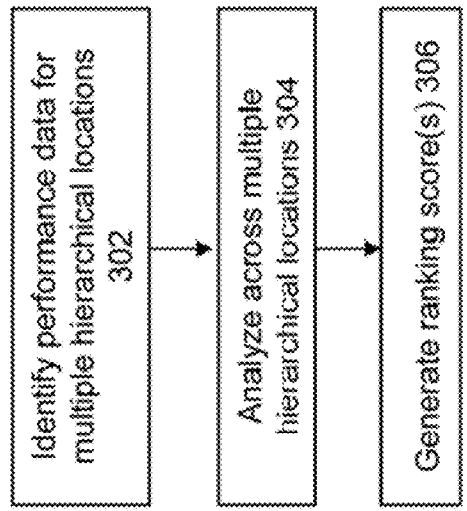
FIG. 3 shows a flow of a process for generating a performance score according to some embodiments of the invention.

FIG. 3 shows a flow of a process that can be used to generate employee scores which addresses these and other problems. According to some embodiments, the inventive ranking mechanism will provide a numeric ranking score for an employee, which is a single calculated value for each employee who has at least one ranking at any level. Therefore, the process begins by identifying performance data for a given employee across multiple hierarchical locations on the employment hierarchy (302). According to some embodiments, the term "multiple hierarchical locations" refers performance data for at least two hierarchical levels and/or for locations that may be at the same hierarchical level, but beneath two hierarchical branches of the employment hierarchy. To explain, consider the rankings described above for employees Andy and Sam. The rankings provided by Mark and Bill for Andy are at two different hierarchical levels of the hierarchal tree shown at FIG. 2. However, the ranking provided for Andy by Mark and the ranking provided for Ram by Sam are rankings along different branches of the employment hierarchy, but are at the same level of the hierarchal tree. The performance data could comprises either, or both, employee ratings or rankings.

Next, the performance data is analyzed for the employees across the multiple hierarchical locations (304). The analysis generates ranking scores for the employees (306). According to some embodiments, the ranking score is an amount between 0 and 100, and takes in effect the ranks obtained by the employee at lower levels.

Figure 4:
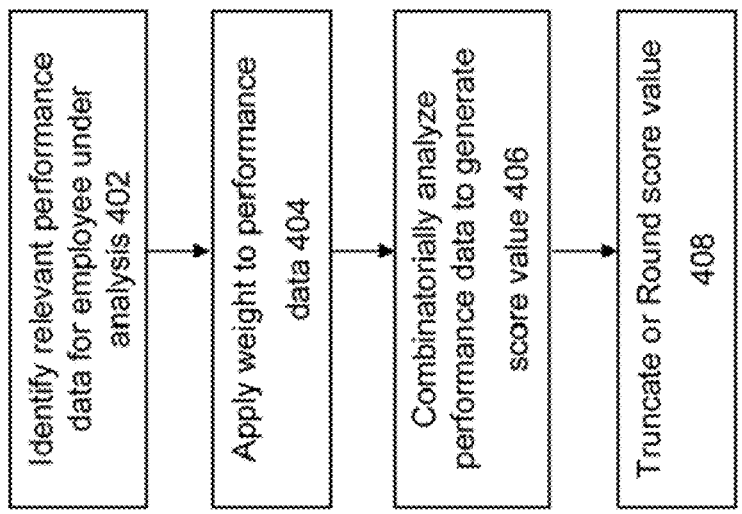
FIG. 4 shows a flow of a detailed process for analyzing performance data to generate a performance score according to some embodiments of the invention.

FIG. 4 shows a more detailed flow of a process for analyzing the performance data to generate ranking scores. The process begins by identifying the relevant performance data which needs to be analyzed for the specific employee(s) for which scoring is desired (402). According to some embodiments, the relevant performance data comprises ranking and/or ratings information for the employees where the employee is ranked from 1 to N by each manager at each appropriate hierarchical location within the employment tree.

Next, appropriate weightings are applied to the collected performance data (404). It may be desirable to impose different levels of relative importance upon the different items of performance data for a given employee or across different employees and managers. For example, one may choose to give greater weight to rankings provided by higher-level managers compared to rankings provided by managers at lower levels of the hierarchy. For example, in the hierarchy shown in FIG. 2, rankings provided by Sue could be given a greater weight than rankings provided by Bill. In addition, one may choose to give greater weight to rankings from a greater population pool. For example, a first employee E1 may be ranked 1 out of 4 by his manager M1, which would make him the top rated employee under his manager M1. Another employee E2 may be ranked 1 out of 100 by his manager M2, which would make him the top ranked employee under his manager M2. Even though they are both ranked number 1 employees by their respective managers, the ranking for employee E2 could be given a greater weight since his ranking is from a larger population pool. Under certain circumstances, a higher manager's rankings have more weight in the score merely by the fact that the employee is being compared to a larger group of people, and it is much more competitive for a high ranking. It is also possible that organization decides to give more weight for senior or experienced employees (as per length of service of an employee) or any other such criteria. Such criteria can be either performance or non-performance based pursuant to an organization decision or other circumstances.

The multiple items of performance data for the employee are then combinatorially analyzed to generate a single scoring value for the employee (406). Any suitable combinatorial formula may be used, depending upon the type of weightings that are desired for the calculations. The following is one example approach that can be taken to analyze the performance data:

$$\text{Score value} = \frac{100 * \left( \sum (\text{Group Population} - \text{Ranking} + 1) \right)}{\sum \text{Group Population}}$$

In this equation, the Group Population value represents the total count of employees at a specified level of rankings. The Ranking value represents the rank given to that employee at the specified level. One key advantage of this approach is that it objectively arrives at the ranking score by considering ranks and populations at some or all levels of the employment hierarchy.

The scoring value generated by this equation may not be a whole number. If desired, the scoring value can be converted to a whole number, e.g., by truncating or rounding the scoring value (408). In some embodiments, any decimals/fractions not displayed can be used in arriving at ranks. Alternatively, decimal/fractional portions can be entirely ignored for the rankings.

This mechanism generates a scoring value that ranges from 0 to 100, with 100 being the highest and best possible value. An employee ranked 1 by all managers will have a score of 100. An employee not ranked number 1 by at least one manager will have a score of less than 100. An employee ranked last by all managers will have a low score, but the actual score will be based on the total population of employees that the person was ranked against (by all managers). In order for an employee to score 0, there will have to be a significant number of employees in the population (2000+), and the employee will have to consistently be ranked at or near the bottom of the each manager's group.

In this approach, it was intentional that a score of 100 is configured to be the best score. This is in contrast to ranking values, where a rank of 1 is considered the best. These two types of values are intentionally configured to be opposite in the present embodiment. One reason for this configuration is to avoid confusion between the ranking percentile (rank/population*100), and the score. In an alternative embodiment, the score can be mathematically manipulated (e.g., inverted) to cause a greater correspondence between scoring values and ranking values.

To illustrate these calculations, consider again the performance ranking data for employee Andy:

| By Mark | 1 of 10 |
| By Bill | 15 of 50 |
| By Sue | 30 of 100 |

Andy's score is calculated by applying the above equation as follows:

Mark's Ranking: 1 of 10, which using formula (Group Population−Ranking+1) is (10−1+1)
Bill's Ranking: 15 of 50, which using formula (Group Population−Ranking+1) is (50−15+1)
Sue's Ranking: 30 of 100, which using formula (Group Population−Ranking+1) is (100−30+1)

These are inserted into the above equations as follows:

$$\frac{100*((10-1+1)+(50-15+1)+(100-30+1))}{(10+50+100)} = 73.125$$

Therefore, the raw scoring value for employee Andy is 73.125. Truncating this raw score produces a final score of 73.

These calculations can similarly be applied to the performance ranking data for employee Ram:

| By Sam | 2 of 20 |
| By Paul | 50 of 250 |
| By Sandy | 60 of 300 |

Ram's score is calculated by applying the above equation as follows:

Sam's Ranking: 2 of 20, which using formula (Group Population−Ranking+1) is (20−2+1)
Paul's Ranking: 50 of 250, which using formula (Group Population−Ranking+1) is (250−50+1)
Sandy's Ranking: 60 of 300, which using formula (Group Population−Ranking+1) is (300−60+1)

These are inserted into the above equations as follows:

$$\frac{100*((20-2+1)+(250-50+1)+(300-60+1))}{(20+250+300)} = 80.877$$

Therefore, the raw scoring value for employee Ram is 80.877. Truncating this raw score produces a final score of 80. Alternatively, rounding may be applied to this raw score to generate a final score of 81.

These scoring values now provide the high level managers some objectively rational basis for making relative comparisons between different employees within the employment hierarchy. Therefore, high-level manager Joe is now able to compare Andy and Ram fairly based on their respective ranking scores. Here, Ram is ranked higher than Andy due to his better (higher) ranking score.

Even though the scoring result using the present embodiment is based on a 100 scale, this scoring value is not a percentile. For example a person ranked 5 of 10 (based upon one manager's ranking) will score 60, however a person ranked 10 of 20 will score a 55. Also, an employee will be ranked against a population of 10 (total) employees to be considered for a score. Otherwise the score will be blank (not zero in one embodiment). The manager viewing the score is included in the scores population. So a low level manager having ranked 10 or more people will see a score for each.

According to some embodiments, the "Group Population" value is not the count of employees at a given level. Instead this value is the maximum ranking given by the manager to anyone. In this way, if the manager only wishes to rank his direct reports, only these direct reports will contribute to the score (e.g. unranked employees will not contribute to the score). Alternatively, if a manager has an obscure way of ranking (e.g., in multiples of 5), then the score will not end up with a score that is negative or exceeding 100. Additionally, the maximum ranking approach makes storing the number at the manager level very easy, which should improve performance when needing to check if updates are needed.

The following variant of the equation may also be used to arrive at the ranking score:

$$\text{Score value} = \frac{100*(\sum(\text{Group Population}-\text{Ranking}))}{\sum(\text{Group Population}-1)}$$

The advantage of this variant is that it provides an assured score of zero to the employee if he is ranked at the bottom by all managers. However, this variant may not be suitable for lower levels of the employment hierarchy, e.g., if there is only one employee under a given manager.

The ranking score maybe maintained at every level of the organization hierarchy for the employee, or one or more scores could be maintained with the score reflecting multiple levels of ranking. When only a single score is maintained, the score is always based on employees complete set of rankings by all managers.

One advantage of the present approach is that, for security, privacy, or other reasons, the score could be used to disguise or hide actual rankings by individual managers. For example, when only a single score is maintained, that score could be configured to be visible to all managers. However, that score disguises the actual rankings by higher managers, but will provide lower managers a sense of how the higher managers have ranked an employee. However, multiple scores approach (score at every level) is more secure than the single score approach as it hides information about the ranks given to employees at higher levels.

The present approach can be used to score any type of performance data, whether or not configured in a hierarchical employee-manager configuration. For example, a customer can use this approach to rank its list of vendors or purchased products, e.g., based upon rankings of vendors or products provided by different departments within the customer's organization.

The present scoring approach greatly aids management in their decision making process to rank employees. When a single score mechanism is used at all levels, It becomes easy for managers at different levels to discuss the performance of an employee.

Figure 5A:
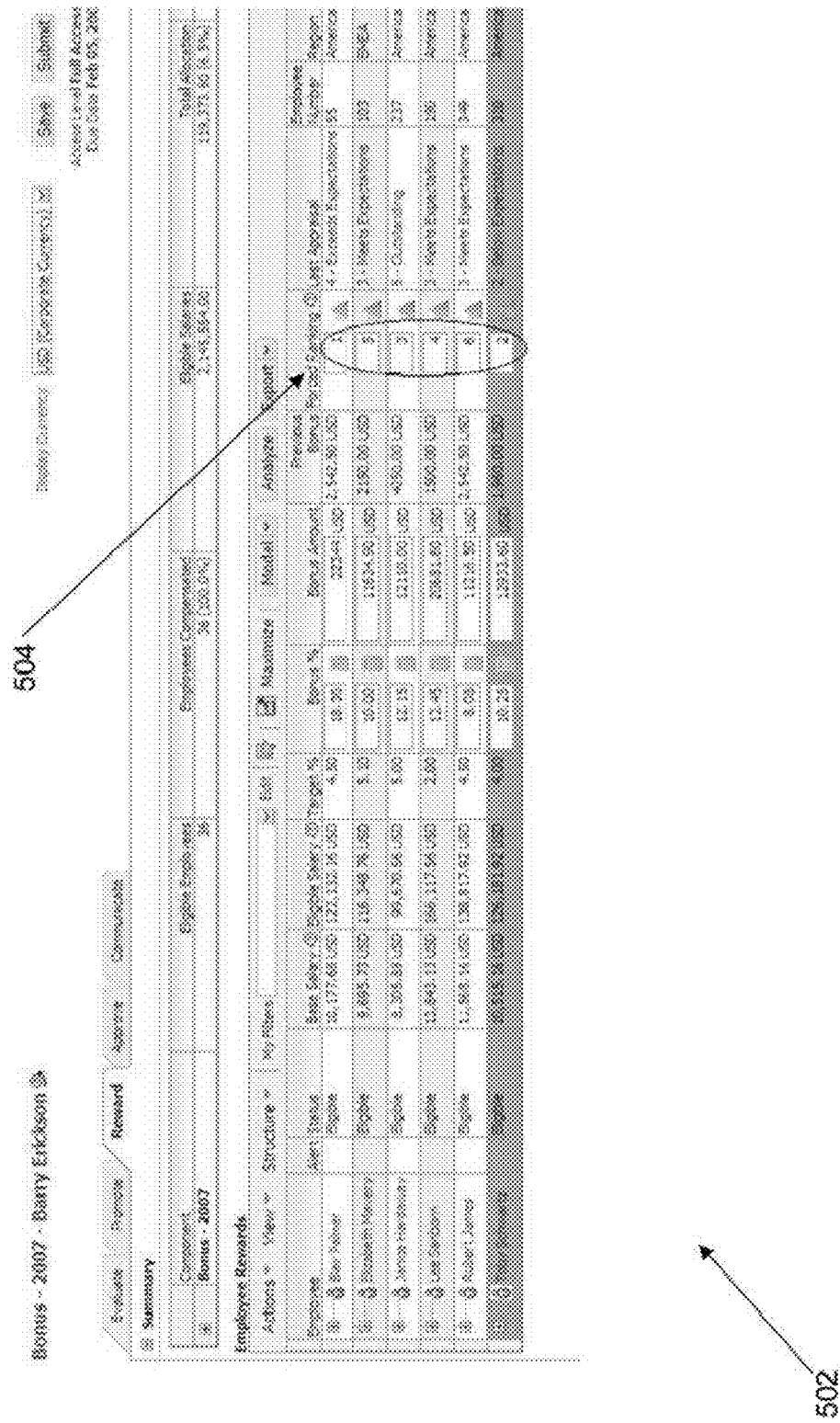

FIG. 5A illustrates an example user interface 502 with which the present scoring mechanism may be employed. User interface 502 provides a column 504 (entitled "Forced Rankings" although it also be referred to as just "Rankings") for allowing a manager to input rankings of employees. This type of ranking creates a 1 to N ranking of employees under that manager.

Figure 5B:
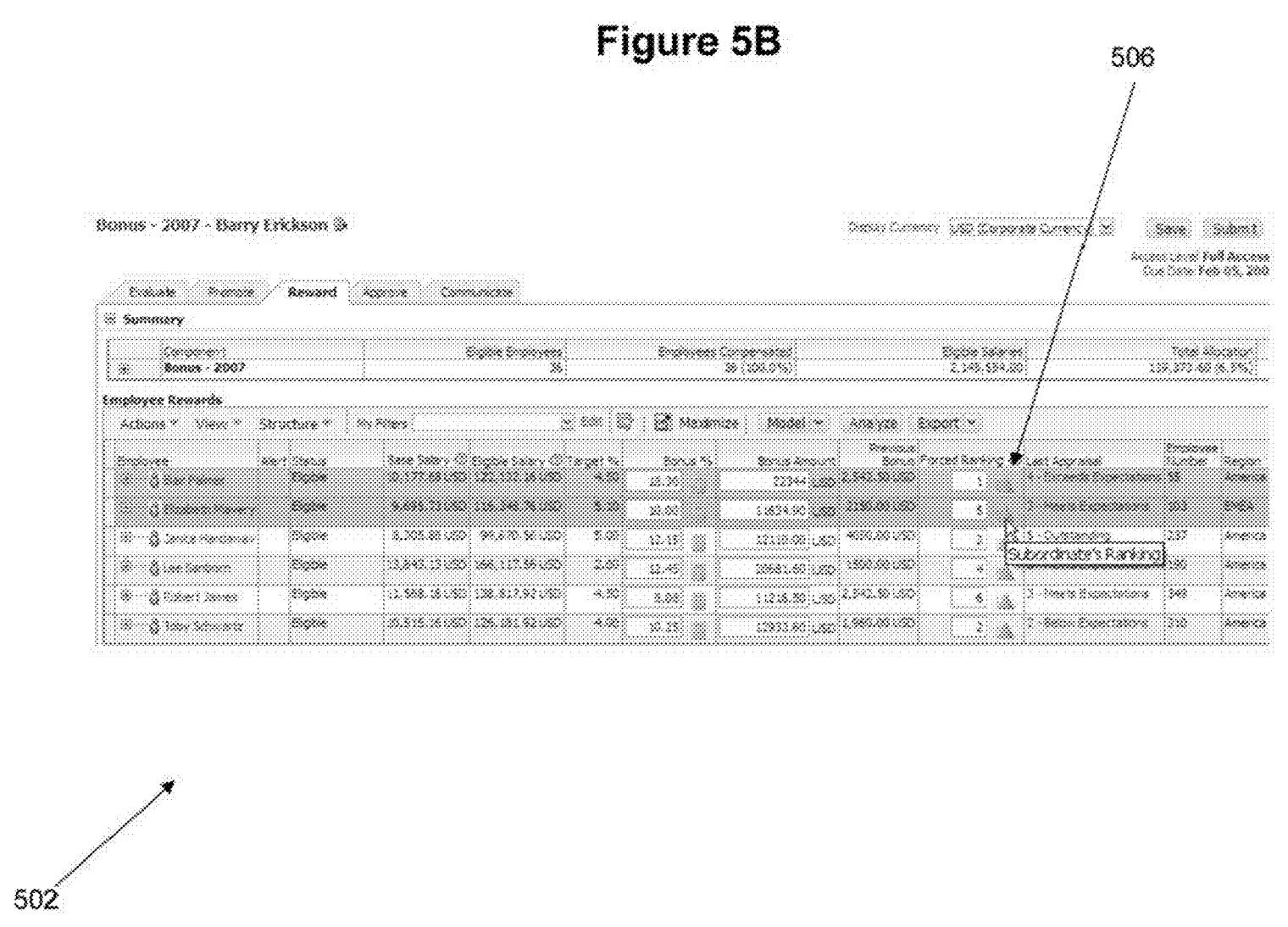
Figure 5C:
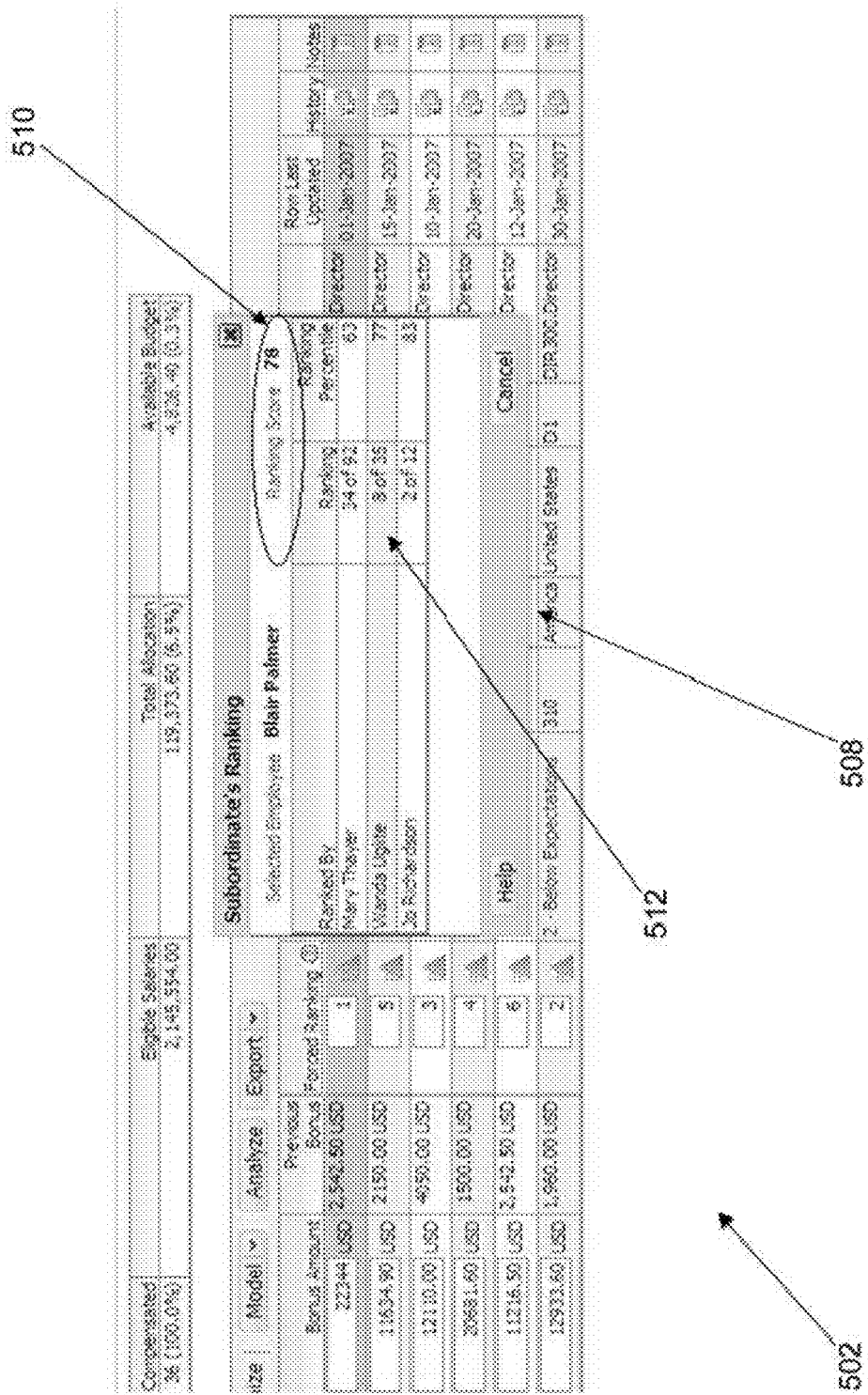

As shown in FIG. 5B, user interface 502 provides an interface device in the form of icons 506 to allow the user to view subordinate rankings and ranking scores. By clicking on an icon 506, the user interface 502 is configured as shown in FIG. 5C. A pop-up window 508 appears that displays the calculated ranking score 510 for the corresponding employee. The window 508 also includes the performance ranking data 512 by the managers that were used to generate the ranking score 510.

Automated Performance Ranking

Some embodiments of the present invention provide an approach for automating the ranking process for assigning ranks to employees within an organization. As previously noted, ranking is typically a very manual and time-consuming process. Within conventional ranking systems, high-level managers often find it difficult to rank their entire employees. The higher the employee population, the more difficult it becomes for managers to assign individual ranks to their employees on a manually basis. The present solution automates the ranking process for middle and high management based on ranks assigned by lower managers in the organization. With the present auto-ranking approach, managers can completely rank their organization at the click of a button. Managers can then manually adjust the rankings as desired. Managers can use the auto-ranking facility over and over, as lower manager continue to refine rankings.

According to some embodiments, managers who have at least one subordinate manager under them will be able to use auto-Rank to rank their employees based on ranks obtained at lower levels. Auto-ranking provides managers with the option to choose the calculation method to arrive at the calculated ranks. The present approach also allows the managers to decide on handling ties and clearing existing ranks.

Figure 6:
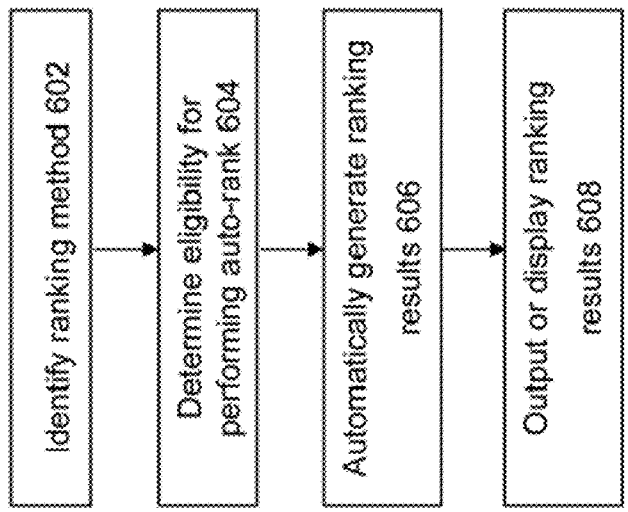
FIG. 6 shows a flow of a process for performing auto-ranking according to some embodiments of the invention.

FIG. 6 shows a high level flow of a mechanism for automating a performance ranking system according to some embodiments of the invention. An identification is made of a calculation method for performing the auto-ranking (602). Any suitable performance scoring, rating, ranking, or calculation approach can be used in embodiments of the invention. The following are examples of calculation methods that are mathematically or logically based on lower level rankings, which can be employed within some embodiments of the invention:

Copy from directs: This approach copies the exact rank for each employee from the manager one level down. This method could be used, for example, by low level managers who are interested in copying ranks from subordinate managers and then make manual modifications to their small population.

Use Ranking Percentile: This approach uses the ranking percentile of the ranks given by managers one level down to distribute the ranks. The ranking percentile brings a person's ranking to a base 100 and is calculated as Rank/Population*100. A variation of using rank percentile would be to consider the mean of ranking percentiles at all levels.

Use Scoring Method: This approach uses the rank values and population at lower levels to arrive at a score for each employee. An example of this type of approach was described above with respect to FIGS. 2-5. This method can be used to rank the employees by sorting on the score.

An organization may wish to restrict the scope of personnel that have permission to perform auto-ranking. Therefore, the auto-rank mechanism may perform the task of determining whether or not the user has requisite permission to perform auto-ranking (604). This could be because certain personnel just have no need to use the auto-rank feature, e.g., because the person is an employee and not a manager that ranks others. In addition, the organization may wish to only allow managers at a threshold level of height in the employment hierarchy to use the auto-rank feature, e.g., on the assumption that at the lower levels of management, the manager should be able to manually perform ranking duties based upon personal knowledge and experience with the employees. In addition, the organization may restrict the auto-rank feature to managers that have a threshold number of employees beneath that manager in the organizational hierarchy.

If the user is authorized to use the auto-rank feature, then auto-ranking is performed to generate ranking results for the relevant employees (606). According to some embodiments, the selected ranking method is used to generate and analyze a set of numerical performance scores for employees. The numerical performance scores are sorted to create a list of employees in order of their performance scores. The sorted list provides the ranks for the employees. The ranking results are displayed to the user or stored in a computer readable medium (608).

Figure 7:
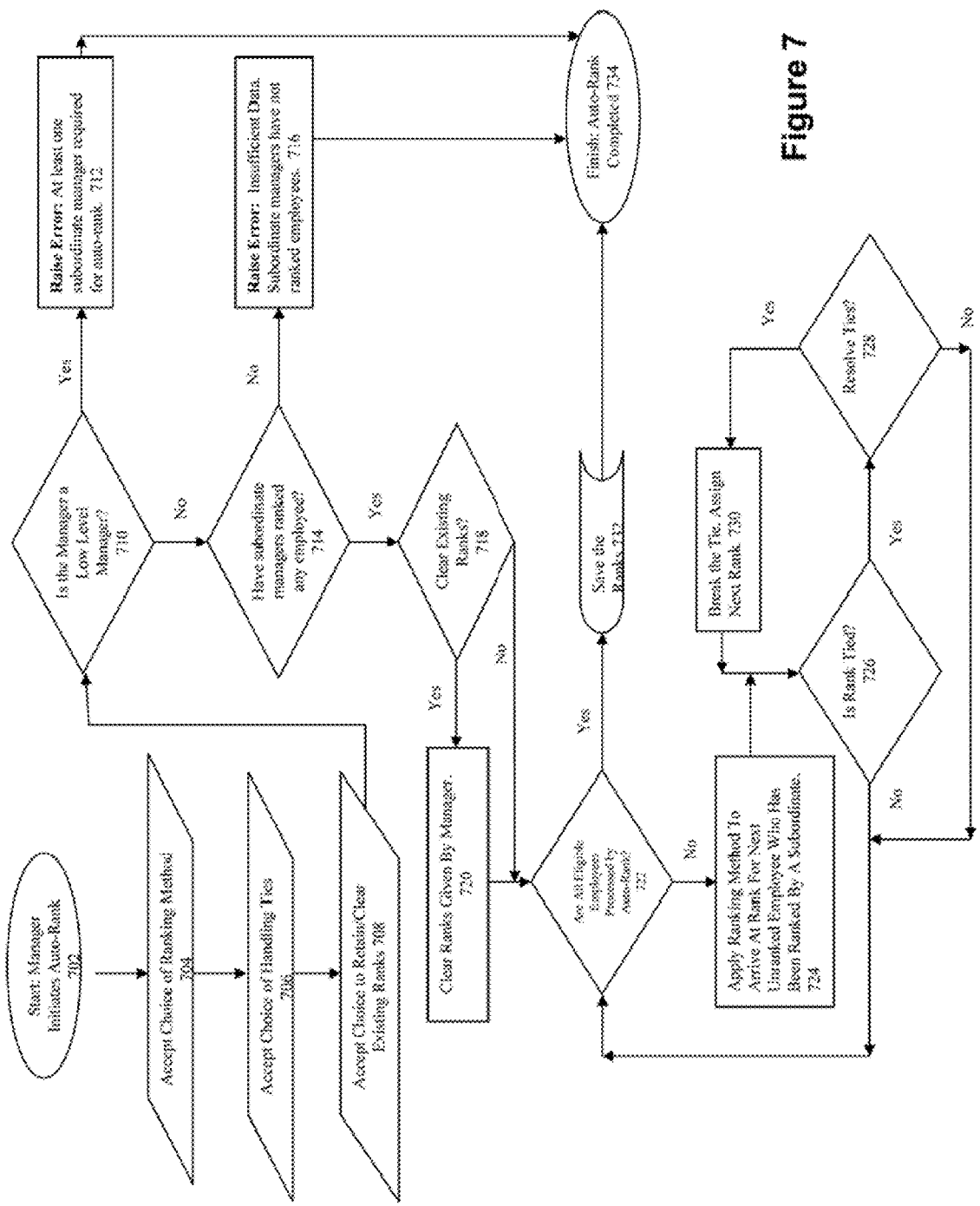
FIG. 7 shows a flow of a detailed process for performing auto-ranking according to some embodiments of the invention.

FIG. 7 shows a more detailed flow of a method and mechanism for performing auto-ranking according to some embodiments of the invention. At 702, the user initiates the process of performing auto-ranking, e.g., using the user interface controls described below with respect to FIGS. 8A-C. At 704, the user selects/accepts a choice of a ranking method to use for the auto-ranking. As previously described, any suitable ranking method may be employed in conjunction with the invention. A suitable ranking method is the scoring mechanism described with respect to FIGS. 2-5.

The user is also given the choice of selecting or accepting a choice of an approach for handling ties (706). It is possible that the selected scoring method will create scoring data for which multiple employees will have the same score. Any suitable approach can be taken to handle ties. One possible approach is to allow ties to exist in the ranking results. Another possible option is to allow the user to arbitrarily rank employees that have tied scores. Yet another option is to use underlying performance data to break the tie. To illustrate this last option, consider the scoring method of FIGS. 2-5, which allows the score to be either truncated or rounded to a whole number. However, this produces a greater possibility of multiple employees having the same final score. For example, a first employee E1 may have a raw score of 88.1, which is truncated to product a final score of 88. A second employee E2 may have a higher raw score of 88.8, which is also truncated to produce the same final score of 88. Since both employees E1 and E2 have the same score, a ranking tie occurs for these employees. One way to address this tie scenario is to use the underlying, raw score values to compare the relative ranks of tied employees. In this example of employees E1 and E2, consideration of the raw scores causes employee E2 to be ranked higher than E1, since the raw score for E2 is higher than the raw score for E1.

The user may be given the choice to either retain or clear existing rank values (708). A manager's direct reports may not be or are never subject to auto-ranking, because, they will have never been ranked by a lower manager. Therefore, a manager may wish to first rank the direct reports prior to auto-ranking. Likewise, a manager may wish to rank a few key employees, or the known employees, or perhaps even half of the team. At any rate, any portion of the employee base might already have a ranking. Therefore, the manager is asked whether be/she wishes to retain these rankings, or clear them all and start from scratch.

If the option to retain current rankings is chosen, then one possible approach is to start with 1, if it is already taken by anyone, then progress to 2; if it is not taken then use it on the highest ranking employee (e.g., as determined by the auto-rank engine). Then, the process will look to see if 3 is filled. If the answer is yes, then move on; otherwise, use it and move one. This approach is used to prevent a duplication of a rating that has already been given to an employee prior initiation of the auto-ranking process.

At 710, a determination is made whether the user is authorized to perform auto-ranking, e.g., by determining whether the user is a low-level or high-level manager. A threshold level of management responsibility could be established to determine whether a given user is authorized to use the auto-ranking feature. For example, a condition could be established to only allow managers that have at least one subordinate manager to use the auto-ranking feature. If the user is not at a sufficient level of management, then the user is denied from using the feature (712).

At 714, a determination is made whether the subordinate managers have adequately ranked the employees. According to some embodiments of the invention, auto-ranking is performed based upon performance ranking data supplied by subordinate managers. Therefore, if the subordinate managers have not made such performance data available, then the auto-ranking process cannot proceed until the data is made available (716).

If the choice had been made to clear existing ranks (718), then the ranks given by the managers are cleared at 720.

At 722, a determination is made whether the employees designated for ranking have already been ranked. This could apply to determine whether all eligible employees have been ranked. Alternatively, this could apply only to a specified list of employees chosen for ranking, which could be less than all eligible employees.

If all employees designated for ranking have not yet been ranked, then at 724, the selected ranking method is applied to generate a rank value for the next unranked employee to be processed. The ranking method will produce a rank/scoring value for the employee.

At 726, a determination is made whether the rank/scoring value newly generated for the employee creates a tie with another employee. Regardless of which auto-ranking method is used, the result can often leave a tie, meaning that at least two people result with the same ranking value. In this event, the auto-rank feature can leave the decision to the user as to how to handle this situation. The manager may retain the tie, thus leaving multiple people ranked 1 for example. Or the user can choose an arbitrarily rank option. For example, if a high level manager is ranking 1,000 people, it may be of low significance whether an employee is ranked 842 vs. 846. Therefore, at a lower level of significance, employees that are tied could be ranked from X to Y randomly or based on a formula using a subset of ranks obtained.

When a tie is retained, the next sequential ranking will be given to the employees that are next in line. In other words, gaps will not be left for the managers to resolve the tie. For example, consider if there are 7 employees with the following scores:

100, 92, 32, 92, 32, 92, and 18

If the option of retaining ties is selected, then these scores correspond to the following ranks:

1, 2, 3, 2, 3, 2, and 4

However, if the option of arbitrarily resolving the ties in ranking is selected, then the scores may correspond, for example, to the following ranks:

1, 2, 5, 3, 6, 4, and 7

Therefore, if at 726 a tie was identified, then a determination is made at 728 whether or not to break the tie. If not, then the process proceeds back to 722. If the decision is made at 728 to break the tie, then the process proceeds to 730 to break the tie, e.g., by arbitrarily assigning ranking values or by using raw scoring data. The result of breaking the tie is checked at 726 to see if it creates another tie.

After all employees designated for ranking have been ranked, then at 732, the ranking results are either saved to a computer readable medium and/or displayed to the user. This action completes the auto-rank process (734).

To illustrate this process, consider the following hierarchy of managers/employees:

Joe→Sue→Bill→Mark→Andy

In this example, Andy is an employee and is not a manager. Mark is a low level manager (no managers beneath him) and has 10 employees under him including Andy. Bill is a manager with 50 employees under him including Mark. Sue is a manager with 100 employees under him including Bill. Joe is the topmost manager with 1000 employees under him including Sue.

In this hierarchy, Joe, Sue and Bill would be able to use the auto-rank feature since they both have subordinate managers beneath them in the hierarchy. Mark cannot use the auto-rank feature since he is a low level manager without any subordinate managers. Andy also cannot use the auto-rank feature since he is an employee and does not rank others as a manager.

Assume that Andy's ranks by the hierarchy of managers is given as follows:

| | |
|---|---|
| By Mark: | 2 of 10 |
| By Bill: | 5 of 50 |
| By Sue: | 20 of 100 |

In this example, Joe is faced with the task of ranking 1000 employees under him, including the rank for Andy. If Joe uses the auto-rank feature, the selected ranking method is applied to generate a rank value for rank for Andy.

If Andy selected the "Copy from Directs", then the auto-rank feature would copy the exact rank for Andy from the manager at one level down from Joe. In this example, since Sue ranked Andy 20 of 100, same rank would be copied over. Therefore, auto-ranking would create a rank of 20 for Andy.

If Andy selects the "Ranking Percentile" approach, then the auto-rank feature would use the ranking percentile of the ranks given by managers one level down from Joe to distribute the ranks, e.g., where the ranking percentile brings a person's ranking to a base 100 and is calculated as Rank/Population*100. Since subordinate manager Sue at the next level down has ranked Andy 20 of 100, Andy has a ranking percentile of 0.20. This percentile value would be arrived at for every employee under Joe for the ranks given by his directs. Assuming that 50 employees have a better (lower) percentile than Andy after such calculation, then he gets a rank 51.

If Andy selects the "Scoring Method" approach, then a mathematical or logical scoring method is employed by the auto-rank feature, e.g., the equation described above with respect to FIGS. 2-5. The above-described equation is as follows:

$$\frac{100 * \left(\sum (\text{Group Population} - \text{Ranking} + 1)\right)}{\sum \text{Group Population}}$$

This equation is applied to the performance ranking score for Andy as follows:

$$\frac{100 * ((10 - 2 + 1) + (50 - 5 + 1) + (100 - 20 + 1))}{10 + 50 + 100} = 85$$

Assuming that 70 employees have a better (higher) score than Andy after such calculation of score, then Andy would receive a rank of 71.

Figure 8A:
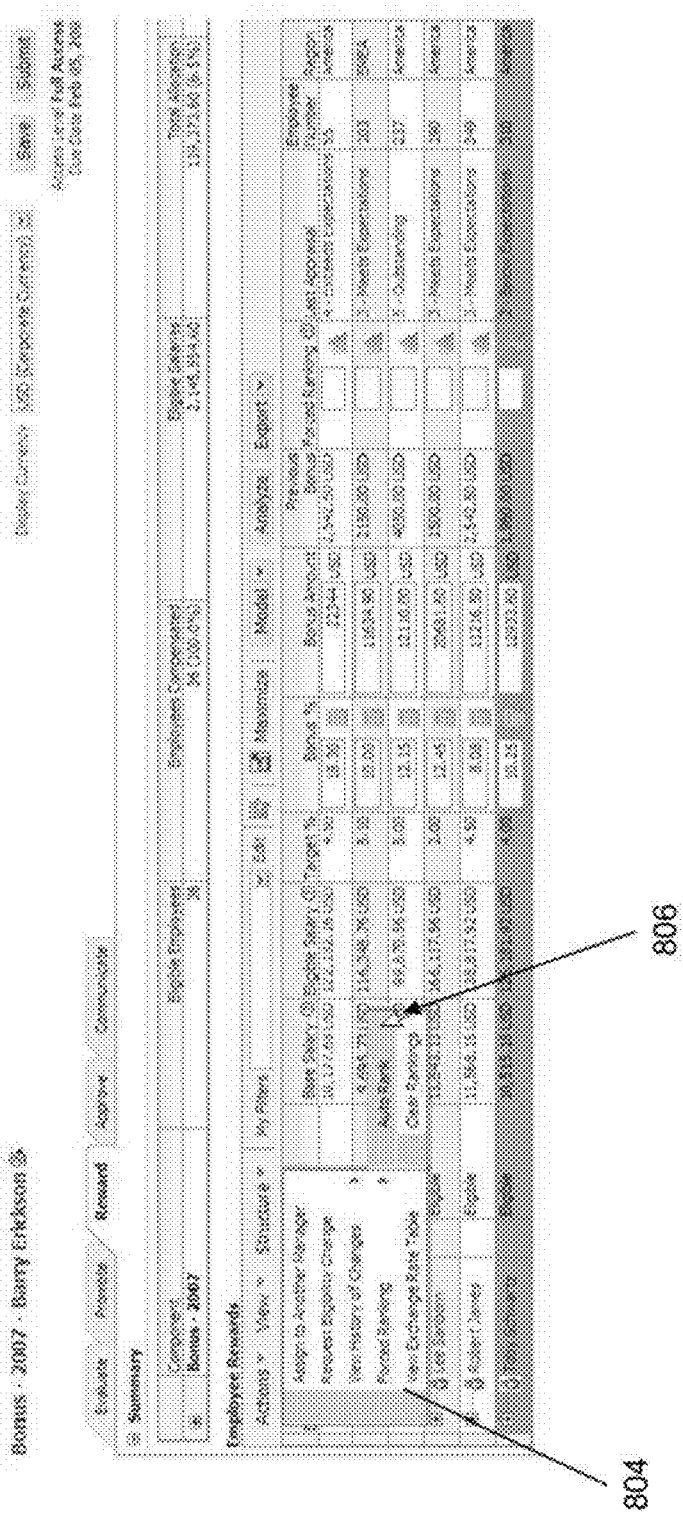

According to some embodiments of a user interface (UI) for the invention, employees can now be ranked at the click of a UI button. FIG. 8A illustrates an example user interface 802 with which the present auto-rank mechanism may be employed. User interface 802 provides a control menu 804 with an option 806 to perform auto-ranking.

Figure 8B:
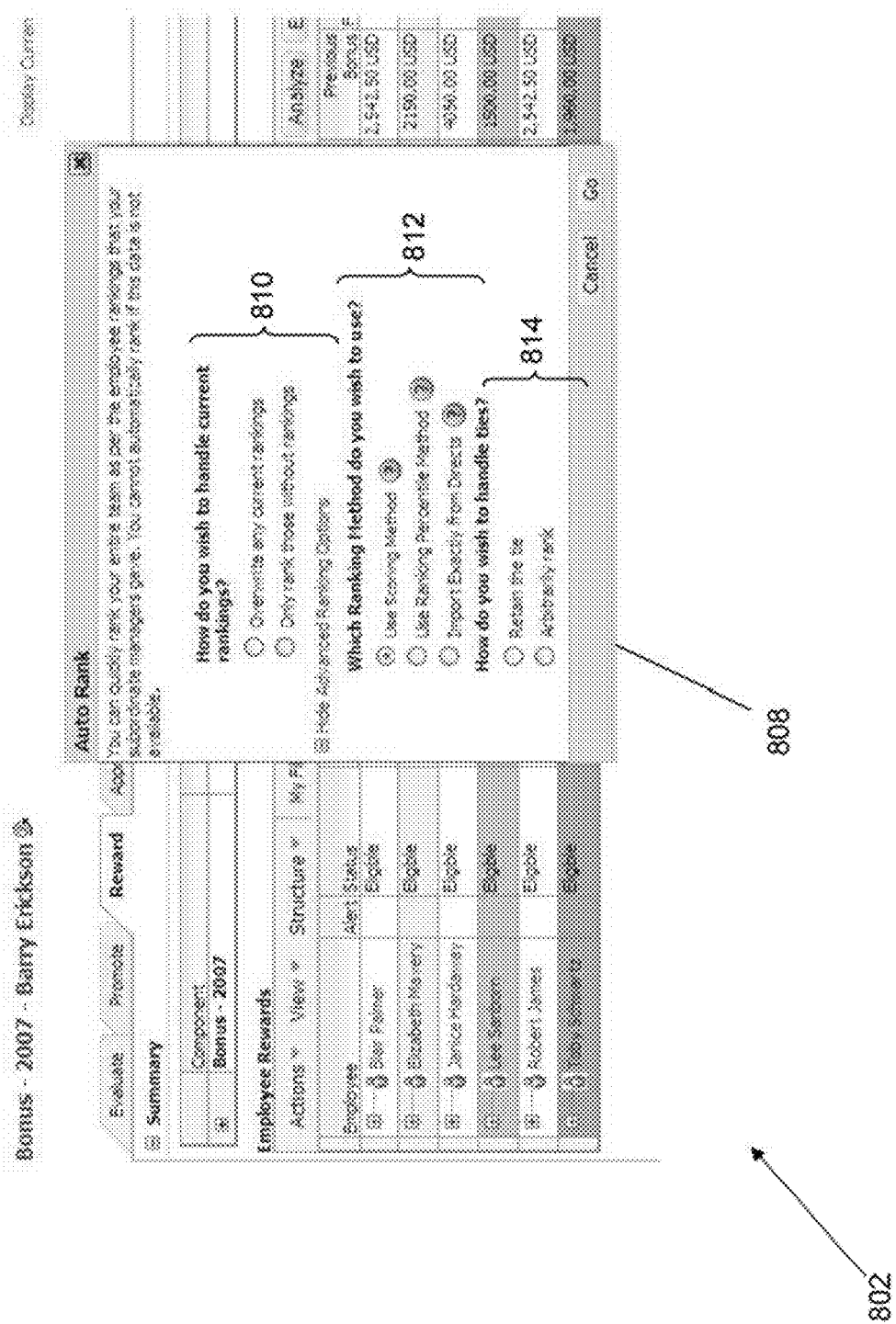
Figure 8C:
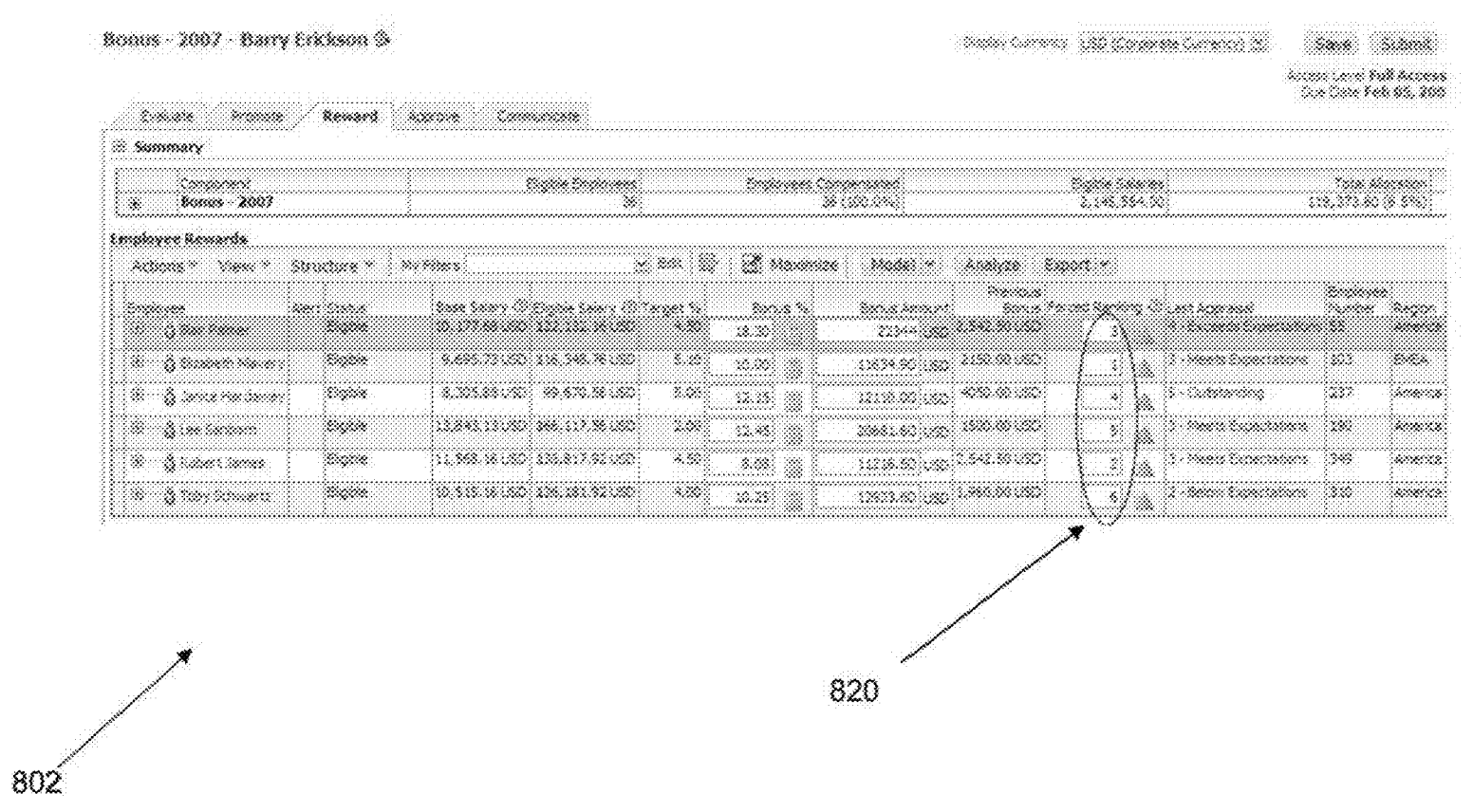

FIG. 8B shows a control window 808 to control the auto-ranking options. In particular, control window 808 comprises a first control portion 810 to select options to either overwrite or retain previous rankings. A second control portion 812 is used to select a ranking method. A third control portion 814 is used to select an approach to handle ties ranks. FIG. 8C shows the user interface 802 after ranking have been imposed. In particular, column 820 entitled "Forced Ranking" corresponds to the results of auto-ranking the employees.

Therefore, what has been described is an advanced approach for scoring and an advanced approach that automates the ranking process for managers, who can rank their subordinate population at the click of a button. The process of Auto-Ranking can be repeated any number of times as the lower managers continue to refine their ranks. When effective methods such as a scoring method is used, Auto-Rank reduces the scope for human errors, resulting in a fair calculation of ranks giving weights to ranks obtained at lower levels. High level managers who have insufficient information to assign individual ranks are assisted by Auto-Rank that suggests an appropriate Rank for every employee at lower levels.

System Architecture Overview

Figure 9:
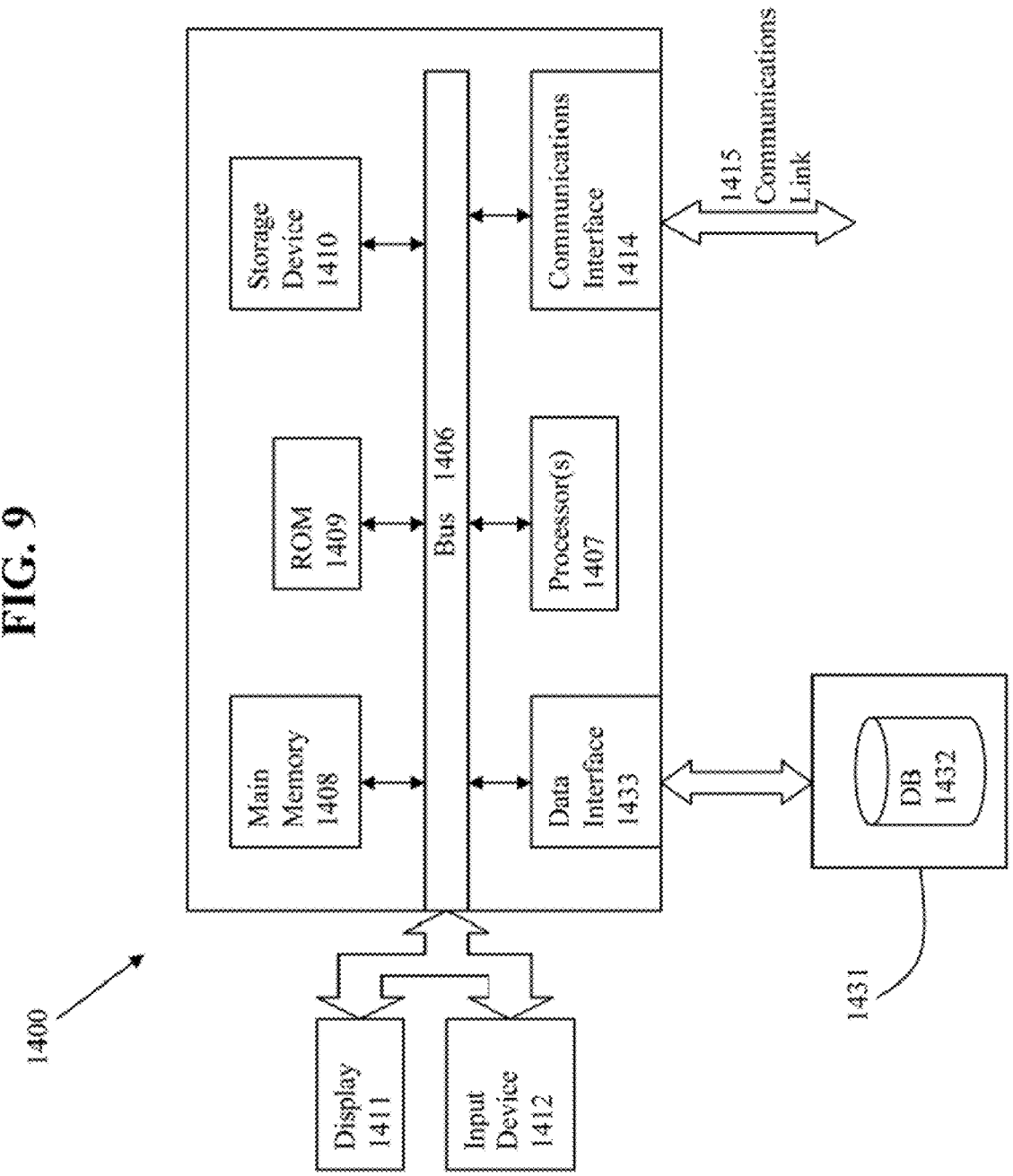
FIG. 9 shows an architecture of an example computing system with which the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for generating a ranking score, comprising:
using at least one processor to generate a user interface having a control window to control generation of ranking data, the control window comprising at least a first control portion and a second control portion, the first control portion controlling updates to previous ranking data stored within a computer readable medium, the second control portion controlling selection of a ranking method for generating the ranking data that updates the previous ranking data within the computer readable medium, wherein operation of the second control portion performs the process comprising:
retrieving performance data for an entity across multiple hierarchical levels of an organization management structure;
analyzing the performance data by combinatorially assessing the performance data from across the multiple hierarchical levels; and
generating a ranking score for the entity at a higher hierarchical level in the multiple hierarchical levels by aggregating multiple ranking scores of the entity that are relative to other respective entities at and are determined by respective supervising entities of two or more hierarchical levels of the multiple hierarchical levels, wherein the multiple ranking scores are aggregated relative to a respective number of entities being ranked in each of the two or more hierarchical levels and a total number of entities in the two or more hierarchical levels, and
the ranking score at the higher hierarchical level is generated dependent upon the multiple ranking scores of the entity at the two or more hierarchical levels that are lower than the higher hierarchical level.

2. The method of claim 1 in which the performance data is weighted to provide multiple levels of analytical importance to different items of the performance data.

3. The method of claim 2 in which weighting is applied based upon identify of a creator of the performance data.

4. The method of claim 2 in which weighting is applied based upon a population pool size from which the performance data was generated.

5. The method of claim 1 in which the ranking score is based upon truncation or rounding of a raw score produced by analyzing the performance data.

6. The method of claim 1 in which the ranking score is a single value for all hierarchical levels corresponding to the entity or multiple values corresponding to different hierarchical levels.

7. The method of claim 1 in which the performance data comprises ranking or rating values by subordinate entities.

8. The method of claim 1 in which the entity comprises an employee and the ranking score comprises a performance score for the employee.

9. The method of claim 1, in which the ranking score is combinatorially generated, and the multiple ranking scores comprise a subordinate rank of the entity considered with a group population for the subordinate rank.

10. The method of claim 9 in which the ranking score is based upon a score value that is determined by the following equation:

$$\text{the score value} = \frac{100 * \left(\sum (\text{Group Population} - \text{Ranking} + 1)\right)}{\sum \text{Group Population}}.$$

11. The method of claim 9 in which the one or more group populations comprise either a total count of entities from which the subordinate rank was derived or is a maximum value provided by a higher-level entity.

12. The method of claim 9 in which the ranking score is based upon the following equation:

$$\text{Score value} = \frac{100 * \left(\sum (\text{Group Population} - \text{Ranking})\right)}{\sum (\text{Group Population} - 1)}.$$

13. The method of claim 1, wherein the updates to the previous ranking data within the computer readable medium results in overwrite of the previous ranking data in the computer readable medium or retention of the previous ranking data in the computer readable medium with ranking of previously unranked data.

14. A computer program product that includes a non-transitory computer readable storage medium, the non-transitory computer readable storage medium comprising a plurality of computer instructions which, when executed by a processor, cause the processor to perform a method for generating a ranking score, the method comprising:

Using the processor to generate a user interface having a control window to control generation of ranking data, the control window comprising at least a first control portion and a second control portion, the first control portion controlling updates to previous ranking data stored within a computer readable medium, the second control portion controlling selection of a ranking method for generating the ranking data that updates the previous ranking data within the computer readable medium, wherein operation of the second control portion performs the process comprising:

retrieving performance data for an entity across multiple hierarchical levels of an organization management structure;

analyzing the performance data by combinatorially assessing the performance data from across the multiple hierarchical levels; and generating a ranking score for the entity at a higher hierarchical level in the multiple hierarchical levels by aggregating multiple ranking scores of the entity that are relative to other respective entities at and are determined by respective supervising entities of two or more hierarchical levels of the multiple hierarchical levels, wherein the multiple ranking scores are aggregated relative to a respective number of entities being ranked in each of the two or more hierarchical levels and a total number of entities in the two or more hierarchical levels, and the ranking score at the higher hierarchical level is generated dependent upon the multiple ranking scores of the entity at the two or more hierarchical levels that are lower than the higher hierarchical level.

15. The computer program product of claim 14 in which the performance data is weighted to provide multiple levels of analytical importance to different items of the performance data.

16. The computer program product of claim 14 in which the ranking score is based upon truncation or rounding of a raw score produced by analyzing the performance data.

17. The computer program product of claim 14 in which the ranking score is a single value for all hierarchical levels corresponding to the entity or multiple values corresponding to different hierarchical levels.

18. The computer program product of claim 14, in which the ranking score is combinatorially generated, and the multiple ranking scores comprise a subordinate rank of the entity considered with a group population for the subordinate rank.

19. The computer program product of claim 14, wherein the updates to the previous ranking data within the computer readable medium results in overwrite of the previous ranking data in the computer readable medium or retention of the previous ranking data in the computer readable medium with ranking of previously unranked data.

20. A system for generating a ranking score, comprising:
a memory comprising a non-transitory computer readable medium holding program code; and
a processor to generate a user interface, wherein the user interface comprises a control window to control generation of ranking data, the control window comprising at least a first control portion and a second control portion, the first control portion controlling updates to previous ranking data stored within the memory, the second control portion controlling selection of a ranking method for generating the ranking data that updates the previous ranking data within the memory, wherein operation of the second control portion controls the processor to execute the program code, where execution of the program code causes the processor to:

retrieve performance data for an entity across multiple hierarchical levels of an organization management structure;

analyze the performance data by combinatorially assessing the performance data from across the multiple hierarchical levels; and generate a ranking score for the entity at a higher hierarchical level in the multiple hierarchical levels by aggregating multiple ranking scores of the entity that are relative to other respective entities at and are determined by respective supervising entities of two or more hierarchical levels locations of the multiple hierarchical levels, wherein the multiple ranking scores are aggregated relative to a respective number of entities being ranked in each of the two or more hierarchical levels and a total number of entities in the two or more hierarchical levels, and the ranking score at the higher hierarchical level is generated dependent upon the multiple ranking scores of the entity at the two or more hierarchical levels that are lower than the higher hierarchical level.

21. The system of claim 20 in which the performance data is weighted to provide multiple levels of analytical importance to different items of the performance data.

22. The system of claim 20 in which the ranking score is based upon truncation or rounding of a raw score produced by analyzing the performance data.

23. The system of claim 20 in which the ranking score is a single value for all hierarchical levels corresponding to the entity or multiple values corresponding to different hierarchical levels.

24. The system of claim 20, in which the ranking score is combinatorially generated, and the multiple ranking scores comprise a subordinate rank of the entity considered with a group population for the subordinate rank.

25. The system of claim 20, wherein the updates to the previous ranking data within the memory results in overwrite of the previous ranking data in the memory or retention of the previous ranking data in the memory with ranking of previously unranked data.

* * * * *